United States Patent
Kawamura et al.

(10) Patent No.: US 8,631,189 B2
(45) Date of Patent: Jan. 14, 2014

(54) STORAGE APPARATUS AND STORAGE SYSTEM

(75) Inventors: Keita Kawamura, Kanagawa (JP); Shingo Aso, Tokyo (JP)

(73) Assignee: Sony Corporation, Tokyo (JP)

( * ) Notice: Subject to any disclaimer, the term of this patent is extended or adjusted under 35 U.S.C. 154(b) by 122 days.

(21) Appl. No.: 13/036,110

(22) Filed: Feb. 28, 2011

(65) Prior Publication Data

US 2011/0231599 A1 Sep. 22, 2011

(30) Foreign Application Priority Data

Mar. 17, 2010 (JP) ................................. 2010-060208

(51) Int. Cl.
*G11C 16/10* (2006.01)
*G06F 12/02* (2006.01)

(52) U.S. Cl.
USPC ................... 711/103; 711/165; 711/E12.008; 711/E12.009; 707/813

(58) Field of Classification Search
None
See application file for complete search history.

(56) References Cited

U.S. PATENT DOCUMENTS

| | | | | |
|---|---|---|---|---|
| 5,481,670 A | * | 1/1996 | Hatashita et al. | 714/6.32 |
| 5,551,003 A | * | 8/1996 | Mattson et al. | 711/136 |
| 5,842,016 A | * | 11/1998 | Toutonghi et al. | 711/165 |
| 5,970,249 A | * | 10/1999 | Holzle et al. | 717/153 |
| 5,999,354 A | * | 12/1999 | Shitara | 360/48 |
| 7,610,437 B2 | * | 10/2009 | Sinclair et al. | 711/103 |
| 7,984,084 B2 | * | 7/2011 | Sinclair | 707/818 |
| 8,046,551 B1 | * | 10/2011 | Sahin | 711/162 |
| 2006/0161724 A1 | | 7/2006 | Bennett et al. | |
| 2007/0033325 A1 | * | 2/2007 | Sinclair | 711/103 |
| 2007/0033376 A1 | * | 2/2007 | Sinclair et al. | 711/203 |
| 2008/0057405 A1 | | 3/2008 | Yoshinari et al. | |
| 2008/0189485 A1 | * | 8/2008 | Jung et al. | 711/115 |
| 2009/0089482 A1 | * | 4/2009 | Traister | 711/103 |
| 2010/0037010 A1 | * | 2/2010 | Yano et al. | 711/103 |
| 2010/0122016 A1 | * | 5/2010 | Marotta et al. | 711/103 |
| 2011/0161562 A1 | * | 6/2011 | Chang et al. | 711/103 |

FOREIGN PATENT DOCUMENTS

JP 2007-058840 3/2007

\* cited by examiner

*Primary Examiner* — Matthew Bradley
*Assistant Examiner* — Daniel Bernard
(74) *Attorney, Agent, or Firm* — Dentons US LLP (57) ABSTRACT

A storage apparatus includes: an input/output section configured to input and output data related to an external access; a memory for storing input data input by the input/output section by distributing the input data to a plurality of areas while making use of a cache area for temporarily storing the input data; and a control section configured to make an access to the memory on the basis of the external access and carry out a garbage collection operation on the areas including the cache area in order to release the cache area in the access made to the memory on the basis of the external access.

4 Claims, 7 Drawing Sheets

STORAGE APPARATUS AND STORAGE SYSTEM

BACKGROUND OF THE INVENTION

1. Field of the Invention

The present invention relates to a storage apparatus allowing external accesses to be made and a storage system employing the storage apparatus.

2. Description of the Related Art

A typical example of the storage apparatus is a flash memory.

In a computer system functioning as the storage system, a host apparatus also employed in the computer system writes data into the flash memory in order to save the data in the flash memory which serves as a storage section (refer to Japanese Patent Laid-open No. 2007-058840).

The flash memory includes cache blocks each used for storing data. If the cache blocks become insufficient, it is necessary to carry out a garbage collection operation on the flash memory in order to assure usable cache blocks.

In the garbage collection operation, valid data stored in a plurality of logical blocks including cache blocks used for storing the data is transferred to a single logical block and, then, the cache blocks included in the logical blocks are initialized.

Thus, the cache blocks already subjected to the garbage collection operation can each be released as a cache block which can be used for storing new data.

SUMMARY OF THE INVENTION

However, the garbage collection operation is carried out typically in accordance with the states of the storage areas in the storage apparatus. The garbage collection operation is carried out typically by execution of firmware of the storage apparatus without regard to accesses each made by the host apparatus as an access to the storage apparatus.

Thus, while the storage apparatus is carrying out the garbage collection operation, an access made by the host apparatus as an access to the storage apparatus may enter a state of a timeout in some cases.

When the number of cache blocks exceeds a prescribed number in a write access made by the host apparatus as an access to the storage apparatus for example, the storage apparatus carries out the garbage collection operation in the period of the write access on a plurality of blocks including the cache blocks.

In addition, after the storage apparatus has carried out the garbage collection operation on the blocks including the cache blocks, the storage apparatus transmits an access-completion notice signal to the host apparatus as a response to the write access.

By the way, since the storage apparatus must carry out the garbage collection operation on a plurality of blocks including the cache blocks, it takes long time to complete the garbage collection operation.

Thus, the access-completion notice signal transmitted by the storage apparatus to the host apparatus as a response to the write access made by the host apparatus as an access to the storage apparatus is delayed due to the execution of the garbage collection operation. As a result, the write access made by the host apparatus as an access to the storage apparatus enters a state of a timeout.

For the reason described above, the storage apparatus is required to be capable of preventing an external access to the storage apparatus from entering a state of a timeout due to the execution of the garbage collection operation.

In accordance with a first embodiment of the present invention, there is provided a storage apparatus including: an input/output section configured to input and output data related to an external access; a memory for storing input data input by the input/output section by distributing the input data to a plurality of areas while making use of a cache area for temporarily storing the input data; and a control section configured to make an access to the memory on the basis of the external access and carry out a garbage collection operation on the areas including the cache area in order to release the cache area in the access made to the memory on the basis of the external access. The control section carries out the garbage collection operation on the areas including the cache area in the access made to the memory on the basis of the external access by dividing the garbage collection operation into a plurality of garbage collection sub-operations, and responds to the external access at a time between every two adjacent ones of the garbage collection sub-operations.

In the storage apparatus according to the first embodiment of the present invention, the garbage collection operation is carried out on a plurality of cache areas during an access made to the memory on the basis of an external access by dividing the garbage collection operation into a plurality of garbage collection sub-operations.

In addition, every time a garbage collection sub-operation is completed, the control section transmits a completion signal to the host apparatus as a response to the external access.

Thus, even if the garbage collection operation is carried out on a plurality of cache areas during an external access, the storage area is capable of transmitting completion signals with proper times as responses to the external access.

In accordance with a second embodiment of the present invention, there is provided a storage system including: a host apparatus; and a storage apparatus accessible to the host apparatus. The storage apparatus has: an input/output section configured to input and output data related to an external access made by the host apparatus; a memory for storing input data input by the input/output section by distributing the input data to a plurality of areas while making use of a cache area for temporarily storing the input data; and a control section configured to make an access to the memory on the basis of the external access and carry out a garbage collection operation on the areas including the cache area in order to release the cache area in the access made to the memory on the basis of the external access. The control section carries out the garbage collection operation on the areas including the cache area in the access made to the memory on the basis of the external access by dividing the garbage collection operation into a plurality of garbage collection sub-operations, and responds to the external access at a time between every two adjacent ones of the garbage collection sub-operations.

The present invention is capable of preventing an external access from entering a state of a timeout due to the execution of the garbage collection operation.

DETAILED DESCRIPTION OF THE PREFERRED EMBODIMENTS

Embodiments of the present invention are explained below by referring to diagrams. The embodiments are described in chapters which are arranged as follows.

1: First Embodiment (A typical implementation transmitting write completion signals as responses in the course of the garbage collection operation divided into a plurality of garbage collection sub-operations)

2: Second Embodiment (A typical implementation transmitting write-in-progress signals as responses in the course of the garbage collection operation divided into a plurality of garbage collection sub-operations and a write completion signal as a response upon completion of all the garbage collection sub-operations)

1: First Embodiment

Configuration of a Memory Card and a Host Apparatus

Figure 1:
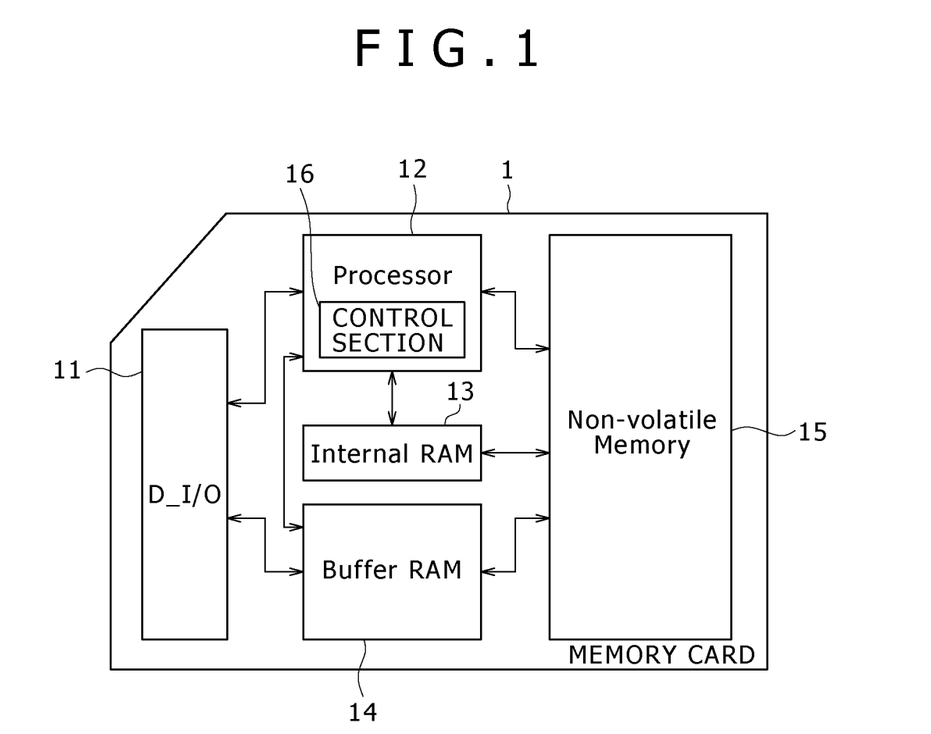
FIG. 1 is a block diagram showing a memory card according to an embodiment of the present invention.

FIG. 1 is a physical block diagram showing the memory card 1 according to the embodiment of the present invention.

The memory card 1 shown in FIG. 1 employs a D_I/O (device input/output) section 11, a processor 12, an internal RAM 13, a buffer RAM 14 and a nonvolatile memory 15.

The memory card 1 shown in FIG. 1 is designed as a card which is used by connecting the card 1 to a host apparatus.

To put it more concretely, the memory card 1 is typically designed as a memory-stick (a registered trademark) card or an SD card. In either case, the memory card 1 can be mounted on the host apparatus and dismounted from the host apparatus.

The nonvolatile memory 15 is typically a nonvolatile semiconductor memory such as a flash memory of the NAND type.

Figure 2:
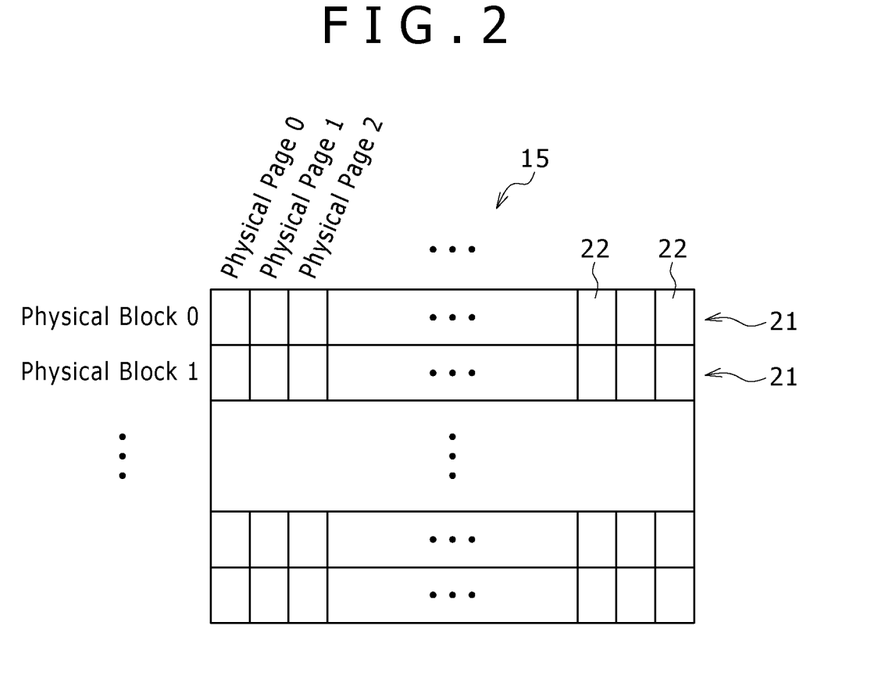
FIG. 2 is an explanatory diagram showing the structure of a storage area of a non-volatile memory.

FIG. 2 is an explanatory diagram showing the structure of the storage area of the non-volatile memory 15.

The non-volatile memory 15 has a plurality of physical blocks 21 which each include a plurality of physical pages 22. Each of the physical pages 22 has a plurality of cells each used for storing data.

In addition, the nonvolatile memory 15 allows a data write operation and a data read operation to be carried out on every physical page 22 unit.

On top of that, the nonvolatile memory 15 allows a data write operation (or an initialization process) to be carried out on every physical block 21 unit.

The nonvolatile memory 15 sustains data written thereon even if the supply of power to the nonvolatile memory 15 is cut off.

It is to be noted that each of the cells of the flash memory of the NAND type is initialized to a predetermined value (for example, 1) by the initialization process. Further, in the data write operation, another value (for example, 0) is written into each cell.

The processor 12 employed in the memory card 1 to serve as a control section 16 of the memory card 1 manages all the storage areas of the nonvolatile memory 15 in a plurality of logical blocks 31.

A logical block 31 is configured to include k physical blocks 21 cited before where notation k denotes an integer at least equal to 1.

Data located at an address used by the host apparatus (2) as write data having a fixed length determined arbitrarily is written into the same logical block 31 indicated by the logical address.

If data cannot be additionally written into the logical block 31 indicated by the address, the memory card 1 acquires a cache block which is a logical block for temporarily storing data and writes the data into the cache block to be stored in the cache block temporarily.

It is to be noted that the size of the storage area of the nonvolatile memory 15 is limited.

Thus, a cache-block count representing the number of cache blocks forming a portion of the storage areas of the nonvolatile memory 15 is also limited as well.

Thus, if all the cache blocks, the number of which in the memory card 1 is limited, are used so that it is necessary to acquire a cache block for another storage range in an operation to write data to an address in the storage range for example, the memory card 1 carries out the garbage collection operation.

By this garbage collection operation, the already used cache blocks are initialized and released.

In addition, valid data stored in a plurality of logical blocks including a cache block is left in a single logical block.

Garbage Collection Operations for Cache Blocks

Figure 3:
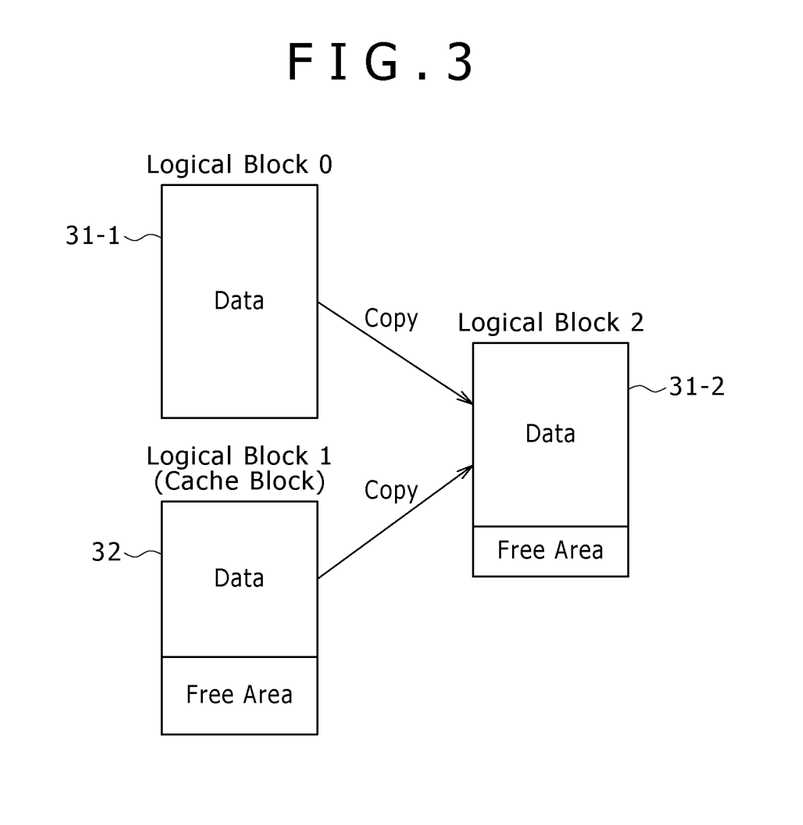
FIG. 3 is an explanatory diagram of a garbage collection operation carried out in order to release a cache block.

FIG. 3 is an explanatory diagram referred to in the following description of the garbage collection operation carried out in order to release a cache block 32.

In FIG. 3, data at an address assigned to a logical block 31-1 has been stored in the logical block 31-1 and a cache block 32 corresponding to the logical block 31-1.

In this case, if the garbage collection operation is carried out, valid data stored in the logical block 31-1 and the cache block 32 is copied to another logical block 31-2 to be stored in the other logical block 31-2 as a single piece of data.

With progress made in recent years in the field of the non-volatile memory 15, the block size has been increasing much.

Thus, in a storage system required to exhibit a real-time characteristic, the time it takes to carry out the garbage collection operation becomes long due to the much increased sizes of the physical and logical blocks. As a result, there are cases in which the time limit given to a response to an instruction issued by the host apparatus is not met.

For example, when the garbage collection operation is carried out to release a used cache block 32 in the execution of a write access instruction issued by the host apparatus, there is a case in which a response to the write access instruction issued by the host apparatus cannot be transmitted to the host apparatus before the time limit given to the response to indicate that the write operation has been completed.

Figure 4:
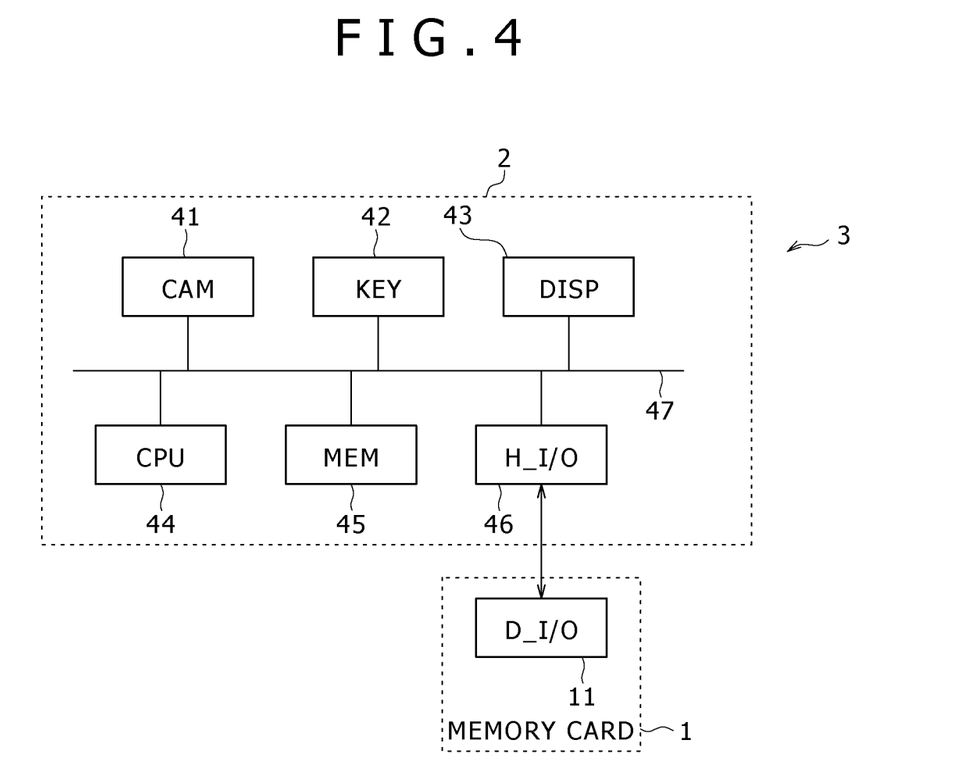
FIG. 4 is a block diagram showing a rough configuration of a camera system employing the memory card shown in FIG. 1.

FIG. 4 is a block diagram showing a rough configuration of a camera system 3 employing the memory card 1 shown in FIG. 1.

The camera system 3 shown in FIG. 4 employs the memory card 1 shown in FIG. 1 and a camera apparatus 2 which functions as the host apparatus.

The camera apparatus 2 shown in FIG. 2 employs a picture taking section (CAM) 41, an operation section (KEY) 42, a display section (DISP) 43, a CPU 44, a memory (MEM) 45, a host input/output section (H_I/O) 46 as well as a system bus 47 which is used for connecting these components to each other.

The picture taking section 41 typically has a CMOS sensor, a CCD or the like.

The picture taking section 41 generates moving-picture data including pictures and voices/sounds, supplying a signal conveying the moving-picture data to the CPU 44.

The operation section 42 typically has a picture taking button and arrow keys.

The operation section 42 supplies a signal according to an operated button or key to the CPU 44.

The display section 43 typically has a TFT display unit or an organic EL display unit.

The display section 43 receives a picture signal from the CPU 44 and displays a picture based on the picture signal.

The memory 45 is used for storing data and programs to be executed by the CPU 44.

The CPU 44 reads in a program stored in advance in the memory 45 and executes the program.

By executing the programs, the CPU 44 serves as a control section 16 of the camera apparatus 2.

The control section 16 carries out control by managing sections including the picture taking section 41, the display section 43 and the host input/output section 46.

The host input/output section 46 has a connector. The memory card 1 can be attached to the connector or detached from the connector.

The host input/output section 46 exchanges data with the device input/output section 11 in accordance with a communication method which conforms to specifications such as the PCI Express specifications or the USB specifications.

The host apparatus makes an access to the memory card 1 in order to write data into the memory card 1 or read out data from the memory card 1.

The memory card 1 shown in FIG. 1 can be put in a slot or a port of the host input/output section 46 and removed from the slot or the port.

The CPU 44 employed in the camera apparatus 2 typically controls the picture taking section 41 to take a moving picture and stores data of the taken moving picture in the memory card 1. At this time, the CPU 44 employed in the camera apparatus 2 makes a write access to the memory card 1.

In addition, the camera apparatus 2 reads out typically image data from the memory card 1 and displays the image data on the display section 43. At this time, the CPU 44 employed in the camera apparatus 2 makes a read access to the memory card 1.

The device input/output section 11 shown in FIG. 1 is connected to the host input/output section 46.

The host input/output section 46 exchanges data with the device input/output section 11 in accordance with a high-speed serial-data communication method which conforms to specifications such as the PCI Express specifications or the USB3.0 specifications.

In a write access made by the host apparatus (2) for example, the device input/output section 11 receives a write command, write data and/or other information from the host input/output section 46. The device input/output section 11 transmits a write-access successful-completion notice signal to the host input/output section 46 as a response signal.

In a read access made by the host apparatus (2), on the other hand, the device input/output section 11 receives a read command and/or other information from the host input/output section 46. The device input/output section 11 transmits read data and a read-access completion notice signal to the host input/output section 46 as a response signal.

The buffer RAM 14 is typically an SRAM or a DRAM.

The buffer RAM 14 is connected to the device input/output section 11, the nonvolatile memory 15 and the processor 12.

The device input/output section 11 writes write data, which has been received from the host apparatus (2) to be eventually written into the nonvolatile memory 15, into the buffer RAM 14.

The write data written into the buffer RAM 14 is eventually transferred to the nonvolatile memory 15 in accordance with control carried out by the processor 12.

On the other hand, read data read out from the nonvolatile memory 15 as requested by the host apparatus (2) is transferred from the nonvolatile memory 15 to the buffer RAM 14 also in accordance with control carried out by the processor 12.

The read data transferred to the buffer RAM 14 is read out by the device input/output section 11.

The internal RAM 13 is also typically an SRAM or a DRAM.

The internal RAM 13 is connected to the nonvolatile memory 15 and the processor 12.

The internal RAM 13 is used for storing an address conversion table for converting a logical address specified in a write or read access made by the host apparatus (2) as an access to the memory card 1 into a physical address in the nonvolatile memory 15. Thus, the address conversion table is also referred to as a logical/physical conversion table.

The processor 12 is connected to the device input/output section 11, the internal RAM 13, the buffer RAM 14 and the nonvolatile memory 15.

The processor 12 employs the CPU 44 and the memory 45.

The CPU 44 of the processor 12 reads a firmware program stored in advance in the memory 45 and executes the program.

In this way, the processor 12 serves as the control section 16 of the memory card 1.

The control section 16 communicates with the host apparatus through the device input/output section 11 and interprets an access command received from the host apparatus in order to carry out processing in accordance with the access command.

When a new write address is received by the device input/output section 11 in a write access for example, the control section 16 carries out a write operation for the new write address.

In the write processing, the control section 16 makes use of the logical/physical conversion table to specify a physical address which corresponds to a write address (logical address).

Subsequently, the control section 16 specifies the physical address in a request for a transfer of the write data from the buffer RAM 14 to the physical address, requesting the transfer of the write data.

As a result, in the nonvolatile memory 15, the write data is stored as data of a predetermined address.

In addition, the control section 16 also updates the logical/physical conversion table.

By the same token, when a new read address is received by the device input/output section 11 in a read access for example, the control section 16 carries out a read operation for the new read address.

In the read operation, the control section 16 makes use of the logical/physical conversion table in order to obtain a most recent physical address for the new read address which is a logical address.

The control section 16 informs the non-volatile memory 15 of the most recent physical address and transfers most recent read data read out from the most recent physical address in the non-volatile memory 15 from the non-volatile memory 15 to the buffer RAM 14.

Finally, the device input/output section 11 reads out the read data from the buffer RAM 14 and supplies the data to the host apparatus (2).

The control section 16 manages a plurality of cache blocks 32 by making use of some storage areas of the non-volatile memory 15.

If a required cache block 32 cannot be acquired in a write operation to store new write data in the memory card 1, the control section 16 carries out the garbage collection operation in order to release used cache blocks 32.

In the garbage collection operation carried out in order to release a used cache block 32, the control section 16 integrates valid data stored in the cache block 32 with valid data stored in a logical block 31 corresponding to the cache block 32 and stores data obtained as a result of the integration in another logical block 31-2. Then, the control section 16 updates the logical/physical conversion table.

Subsequently, the control section 16 initializes the cache block 32 and the logical block 31 which have been subjected to the garbage collection operation.

Thus, the cache block 32 is released as a usable cache block 32 into which new data can be written.

The control section 16 acquires this released cache block 32 and stores new write data in the cache block 32.

Next, operations carried out by the memory card 1 according to the first embodiment are explained below.

The operations are described below by taking operations, which are carried out by the memory card 1 when the host apparatus (2) makes a write access to the memory card 1, as an example.

Garbage Collection Operation Carried Out on Cache Blocks in a Write Access

Figure 5:
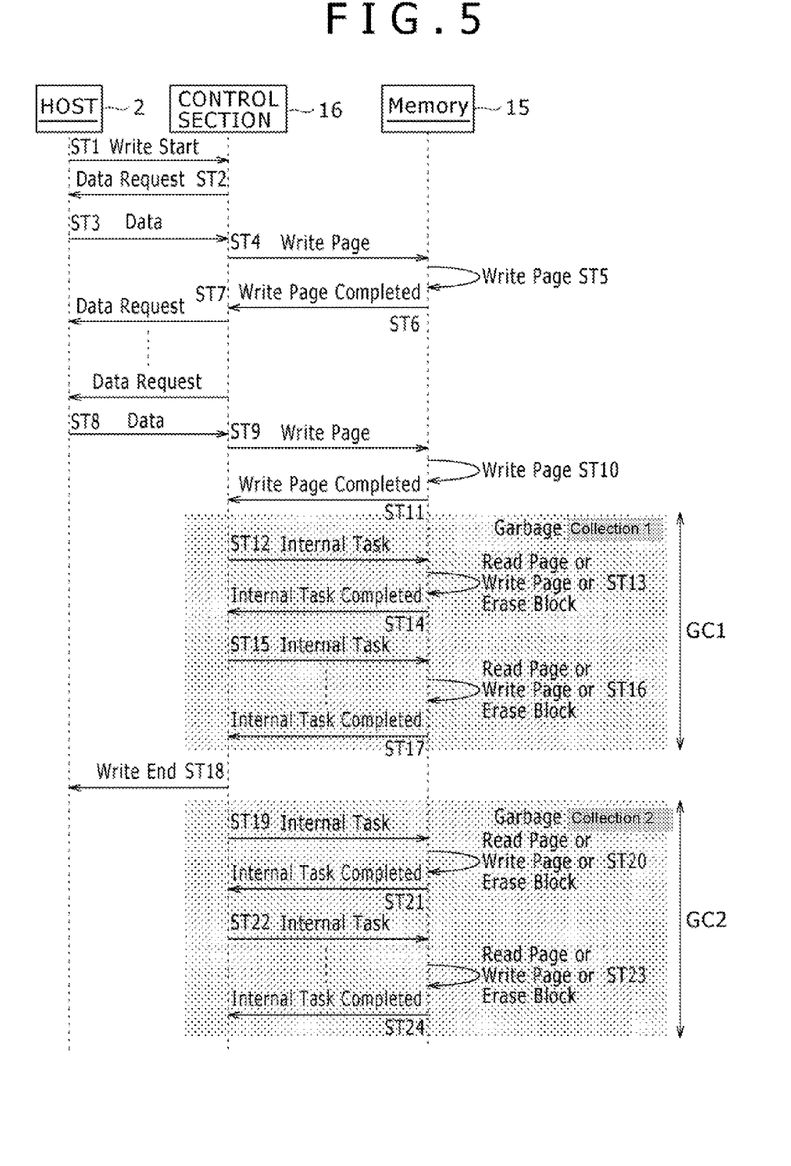
FIG. 5 shows a chart of a sequence of operations carried out to store data in the memory card in accordance with a first embodiment.

FIG. 5 shows a chart of a sequence of operations carried out to store data in the memory card 1 in accordance with the first embodiment.

In FIG. 5, there are shown the host apparatus (2), the control section 16 employed in the memory card 1 and the nonvolatile memory 15. In FIG. 5, the time axis is oriented in the vertical direction, starting from the top of the diagram.

It is to be noted that the operation sequence shown in FIG. 5 is a typical sequence in which, in order to release a cache block 32, the host apparatus (2) carries out a garbage collection operation on data having a size of four pages by dividing the garbage collection operation into garbage collection sub-operations GC1 and GC2.

In a write access to the memory card 1, the CPU 44 employed in the host apparatus (2) issues a write command to the memory card 1 at a step ST1.

The write command is transmitted from the host input/output section 46 to the device input/output section 11 and received by the control section 16 which is actually the processor 12.

Receiving the write command, the control section 16 issues a data request to the host apparatus (2) at the next step ST2.

The data request is transmitted from the device input/output section 11 to the host input/output section 46 and received by the CPU 44 employed in the host apparatus (2).

Then, at the next step ST3, the host apparatus (2) outputs the write data to the memory card 1.

The write data is transmitted from the host input/output section 46 to the device input/output section 11 and stored in the buffer RAM 14.

As the write data is stored in the buffer RAM 14, the control section 16 starts an operation to transfer the write data.

At the next step ST4, the control section 16 refers to the logical/physical conversion table to specify a physical address of a physical block into which the write data is to be stored for the nonvolatile memory 15.

At this time, if an available physical page 22 remaining in an initialized state does not exist in the physical address included in the nonvolatile memory 15 to serve as a physical address into which the write data is to be stored, the control section 16 acquires a cache block 32 which corresponds to the logical address and specifies a physical address included in a cache block 32.

Then, at the next step ST5, the nonvolatile memory 15 reads the write data from the buffer RAM 14 to store the write data in the specified physical address.

As the write operation to store the write data in the non-volatile memory 15 is completed, the flow of the sequence of operations goes on to the next step ST6 at which the nonvolatile memory 15 provides the control section 16 with a write-operation completion signal which notifies the control section 16 that the write operation has been completed.

When the control section 16 is informed that the write operation to store the first write data into the nonvolatile memory 15 has been completed, the flow of the sequence of operations goes on to the next step ST7 at which the control section 16 issues a request for the next write data to the host apparatus (2).

The host apparatus (2) supplies the next write data to the memory card 1 at the next step ST8.

The next write data is stored in the buffer RAM 14.

At the next step ST9, as a next write destination of the write data, the control section 16 specifies the physical address of the cache block 32 for example.

Then, at the next step ST10, the nonvolatile memory 15 reads out the next write data from the buffer RAM 14 to store the write data into the specified cache block 32.

As the write operation to store the next write data in the nonvolatile memory 15 is completed, the flow of the sequence of operations goes on to the next step ST11 at which the nonvolatile memory 15 provides the control section 16 with a write-operation completion signal which notifies the control section 16 that the write operation has been completed.

Then, in the typical operation sequence shown in FIG. 5, at a point of time at which the second write operation to store the second write data into the non-volatile memory 15 is completed at the step ST11, unused cache blocks are no longer available.

In this case, the control section 16 carries out the garbage collection operation in order to release a cache block 32.

When the number of cache blocks 32 exceeds a prescribed number in a write access made by the host apparatus (2) for example, the control section 16 also carries out the garbage collection operation in the period of the write access on a plurality of blocks including the cache blocks 32.

In the garbage collection operation carried out in order to release a cache block 32, first of all, the control section 16 performs the garbage collection sub-operation GC1.

In the garbage collection sub-operation GC1, the control section 16 carries out a copy operation on some of valid data stored in a plurality of blocks including the cache block 32.

To put it more concretely, at the next step ST12, the control section 16 makes a request for internal processing to be carried out on valid data of one page to copy the data to a logical block 31-2. The valid data of one page is data of the cache block 32 and a logical block 31 corresponding to the cache block 32.

Thus, as described above, in the non-volatile memory 15, the specified data, which is the valid data of one page, is copied from the cache block 32 or the logical block 31 to the other logical block 31-2 serving as a new and unused logical block. When all the valid data of the cache block 32 or the logical block 31 has been copied to the logical block 31-2 in this copy operation, in the non-volatile memory 15, the cache block 32 or the logical block 31 is initialized at the next step ST13.

As the copy operation and the initialization are completed, the non-volatile memory 15 supplies a completion signal to the control section 16 at the next step ST14.

Then, the control section 16 registers the logical block 31-2 used for newly storing the valid data in the logical/physical conversion table.

As the copy operation of the first page for the cache block 32 and the logical block 31 is completed, the control section 16 starts a copy operation of the next valid page which has not been processed yet.

To put it more concretely, at the next step ST15, the control section 16 makes a request for internal processing to be carried out on valid data of the second page which is the next valid page.

Then, at the next step ST16, in the non-volatile memory 15, the copy operation and the necessary initialization are carried out on the valid data of the second page. Subsequently, at the next step ST17, the non-volatile memory 15 outputs a completion signal to the control section 16.

Then, the control section 16 updates the logical/physical conversion table.

As the garbage collection operation for the two pages of the cache block 32 is completed, the control section 16 suspends the garbage collection sub-operation GC1.

Then, at the next step ST18, the control section 16 transmits a write completion response signal to the host apparatus (2).

The CPU 44 employed in the host apparatus (2) receives the write completion response signal from the memory card 1.

Thus, the host apparatus (2) is capable of determining that the write operation to store the write data transmitted to the memory card 1 has been normally completed.

After transmitting the write completion response signal to the host apparatus (2), the control section 16 carries out the second garbage collection sub-operation GC2. In this way, the control section 16 resumes the garbage collection operation.

In the garbage collection sub-operation GC2, a copy operation of all remaining valid data for a plurality of blocks including the cache block 32 is carried out.

To put it more concretely, at the next step ST19, the control section 16 makes a request for internal processing to be carried out on data of the valid third page for the cache block 32 and the logical block 31.

Then, at the next step ST20, in the non-volatile memory 15, the copy operation and the necessary initialization are carried out on the data of the valid third page. Subsequently, at the next step ST21, the non-volatile memory 15 outputs a completion signal to the control section 16.

Then, the control section 16 updates the logical/physical conversion table.

Subsequently, at the next step ST22, the control section 16 makes a request for internal processing to be carried out on data of the valid fourth page for the cache block 32 and the logical block 31.

Then, at the next step ST23, in the non-volatile memory 15, the copy operation and the necessary initialization are carried out on the data of the valid fourth page. Subsequently, at the next step ST24, the non-volatile memory 15 outputs a completion signal to the control section 16.

Then, the control section 16 updates the logical/physical conversion table.

By carrying out a plurality of garbage collection sub-operations as described above, the control section 16 performs the garbage collection operation in order to release a cache block 32 during the period of a write access made by the host apparatus (2).

By this operation, a plurality of the cache blocks 32 are initialized and released.

Garbage Collection Operation Carried Out in a Typical Comparison Configuration on a Cache Block During a Write Access Next, the following description explains a garbage collection operation carried out in a typical comparison configuration.

It is to be noted that, in the following description, for the sake of the convenience of the explanation, elements identical with their respective counterparts employed in the first embodiment are denoted by the same reference numerals and the same reference names as the counterparts.

Figure 6:
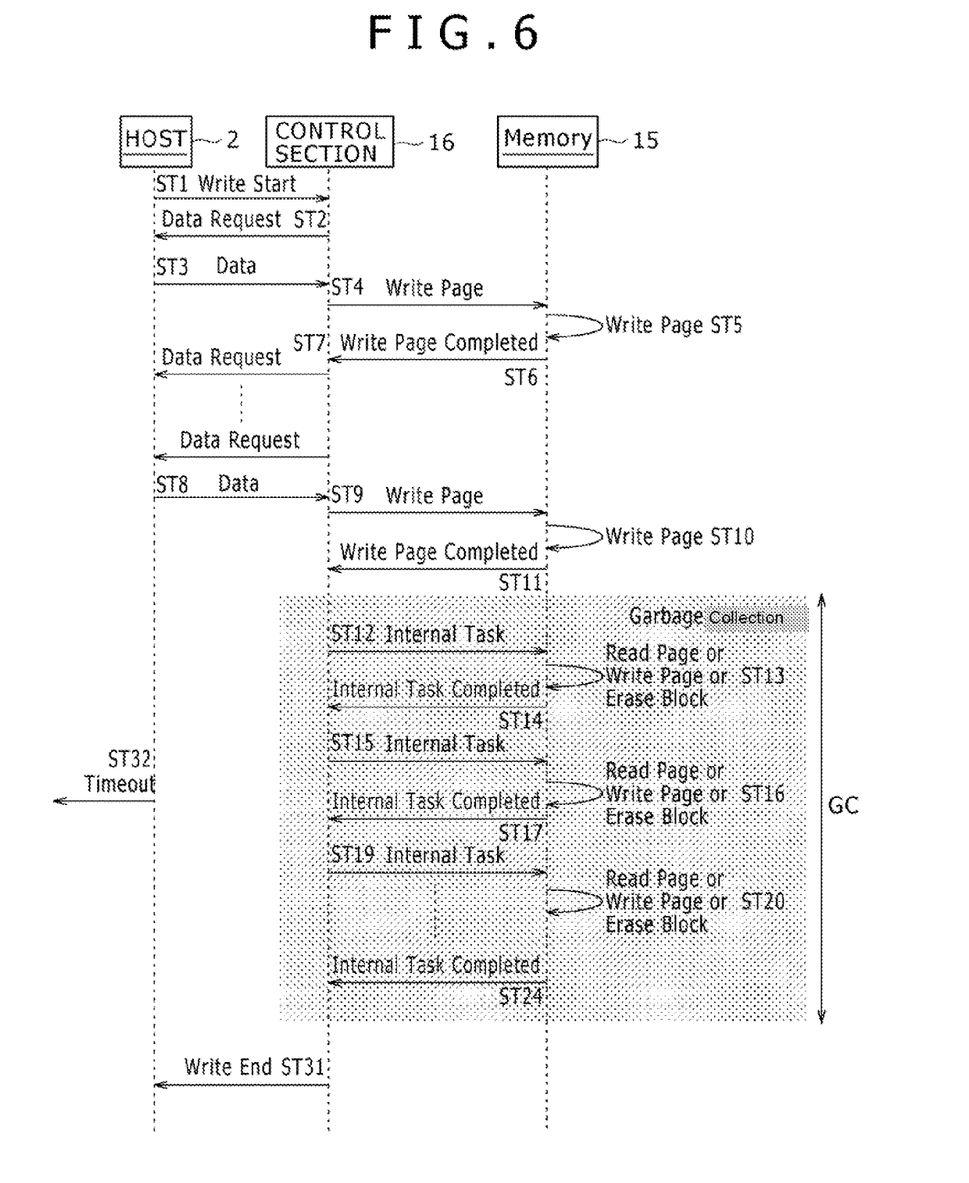
FIG. 6 shows a chart of a sequence of operations carried out to store data in the memory card in accordance with a typical comparison configuration.

FIG. 6 shows a chart of a sequence of operations carried out to store data in the typical comparison configuration.

In FIG. 6, there are shown the host apparatus (2), the control section 16 employed in the memory card 1 and the nonvolatile memory 15. In FIG. 6, the time axis is oriented in the vertical direction, starting from the top of the diagram.

It is to be noted that, similar to FIG. 5, the operation sequence shown in FIG. 6 is a typical sequence in which, in order to release a cache block 32, the host apparatus (2) carries out a garbage collection operation on data having a size of four pages by the single garbage collection operation GC.

In the typical comparison configuration in FIG. 6, when the control section 16 receives a write command from the host apparatus (2), the control section 16 issues a request for write data of the write command to the host apparatus (2).

At steps ST1 to ST11, the write data is received from the host apparatus (2) and stored in the buffer RAM 14 before being transferred from the buffer RAM 14 to the nonvolatile memory 15.

In addition, when an unused cache block 32 is no longer available due to the second write operation, the control section 16 carries out a garbage collection operation in order to release a cache block 32 in the period of a write access made by the host apparatus (2).

At steps ST12 to ST24, the control section 16 carries out copy operations of valid data of four pages in the cache block 32 and a logical block 31 corresponding to the cache block 32.

In addition, the control section 16 initializes the cache block 32 and the logical block 31 corresponding to the cache block 32, releasing the cache block 32.

Later on, at a step ST31, the control section 16 transmits a write-access successful-completion notice signal to the host apparatus (2) as a response signal.

As described above, in the first embodiment, before the host apparatus (2) enters a state of a timeout for the write-completion response signal to be received from the memory card 1, the memory card 1 is capable of transmitting the write-completion response signal to the host apparatus (2).

Thus, in accordance with the first embodiment, in a storage system for storing a moving picture like the one shown in FIG. 4 in the memory card 1 on a real-time basis, there is no case in which the host apparatus (2) enters a state of a timeout for the write-completion response signal to be received from the memory card 1 due to a garbage collection operation carried out during the period of a write access in order to release a cache block 32.

That is to say, in the first embodiment, by making use of a nonvolatile semiconductor memory 45 such as the flash memory of the NAND type as a storage section used for storing a moving picture, a real-time system can be implemented by this embodiment.

As described above, in the first embodiment, in order to release a cache block 32, a garbage collection operation is carried out during the period of an access made in the host apparatus (2) as an access to the memory 45 by dividing the garbage collection operation into a plurality of garbage collection sub-operations.

In addition, at a time between every two adjacent ones of the garbage collection sub-operations, the control section 16 transmits an operation completion signal to the host apparatus (2) in response to the access made by the host apparatus (2).

Thus, in the first embodiment, even if a garbage collection operation is carried out in order to release a cache block 32 during the period of an access made by the host apparatus (2), the memory card 1 is capable of transmitting an operation completion signal to the host apparatus (2) in response to the access with a proper timing.

As a result, in the first embodiment, there is no case in which the host apparatus (2) enters a state of a timeout for the access completion response signal to be received from the memory card 1 due to a garbage collection operation carried out during the period of the access in order to release a cache block 32.

2: Second Embodiment

Configurations of the Memory Card and the Host Apparatus

The configurations of the memory card 1 and the host apparatus (2) which are employed in a second embodiment are identical with respectively the configurations of the memory card 1 and the host apparatus (2) which are employed in the first embodiment and have been explained earlier by referring to the diagrams serving as FIGS. 1 to 4.

For the above reasons, in the configurations of the memory card 1 and the host apparatus (2) which are employed in the second embodiment, elements identical with their respective counterparts employed in the first embodiment are denoted by the same reference numerals and the same reference names as the counterparts.

However, the garbage collection operation carried out by the control section 16 in order to release a cache block 32 in the second embodiment is different from the garbage collection operation carried out by the control section 16 in order to release a cache block 32 in the first embodiment.

To put it more concretely, in the case of the second embodiment, the memory card 1 transmits an operation-in-progress response signal to the host apparatus (2) at a time between every two adjacent ones of the garbage collection sub-operations and transmits a write-operation completion response signal to the host apparatus (2) upon completion of the execution all the garbage collection sub-operations.

It is to be noted that, the memory card 1 may also transmit a write-operation completion response signal to the host apparatus (2) at a time between every two adjacent ones of the garbage collection sub-operations and transmits another response signal to the host apparatus (2) upon completion of the execution all the garbage collection sub-operations. The information conveyed by every response signal transmitted by the memory card 1 to the host apparatus (2) with a timing can be properly changed in accordance with a storage system which employs the memory card 1 and the host apparatus (2).

Garbage Collection Operation Carried Out on a Cache Block in a Write Access

Next, operations carried out by the memory card 1 according to the second embodiment are explained as follows.

The operations described below are operations carried out in a typical case in which the host apparatus (2) makes a write access to the memory card 1.

Figure 7:
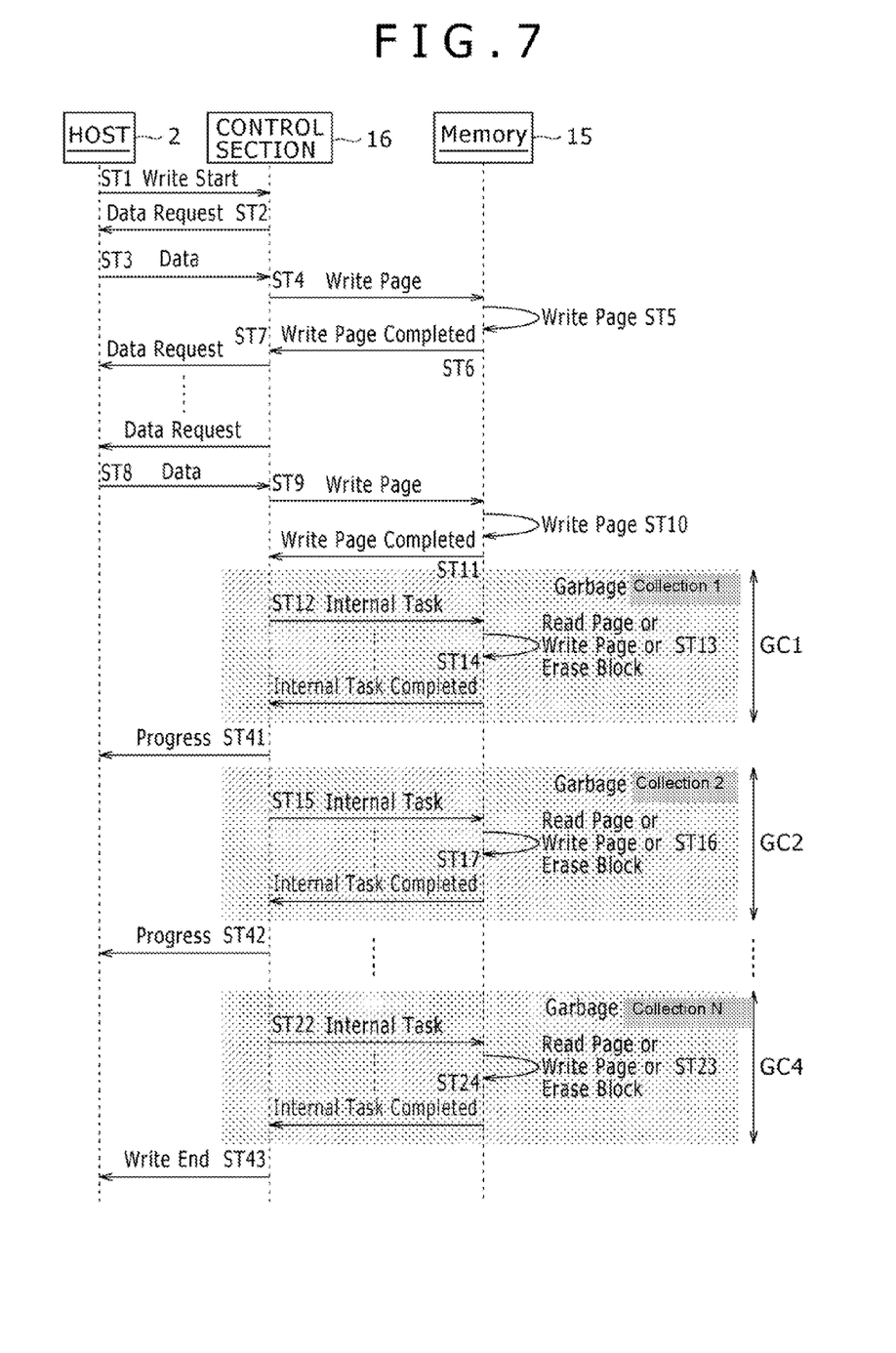
FIG. 7 shows a chart of a sequence of operations carried out to store data in the memory card in accordance with a second embodiment.

FIG. 7 shows a chart of a sequence of operations carried out to store data in the memory card 1 in accordance with the second embodiment.

In FIG. 7, there are shown the host apparatus (2), the control section 16 employed in the memory card 1 and the nonvolatile memory 15. In the diagram which serves as FIG. 7, the time axis is oriented in the vertical direction, starting from the top of the diagram.

It is to be noted that the operation sequence shown in FIG. 7 is a typical sequence in which, in order to release a cache block 32, the host apparatus (2) carries out a garbage collection operation on data having a size of four pages by dividing the garbage collection operation into garbage collection sub-operations GC1 to GC4.

In FIG. 7, when the control section 16 receives a write command from the host apparatus (2), the control section 16 issues a request for write data of the write command to the host apparatus (2). At steps ST1 to ST11, the write data is received from the host apparatus (2) and stored in the buffer RAM 14 before being transferred from the buffer RAM 14 to the nonvolatile memory 15.

In addition, when an unused cache block 32 is no longer available due to the second write operation, the control section 16 carries out a garbage collection operation in order to release a cache block 32 in the period of a write access made by the host apparatus (2).

In the garbage collection operation carried out in order to release a cache block 32, first of all, the control section 16 carries out the first garbage collection sub-operation GC1 as follows. At a step ST12, the control section 16 makes a request for internal processing to be carried out on valid data of one page to copy the data to a logical block 31-2. The valid data of one page is data of the cache block 32 and a logical block 31 corresponding to the cache block 32.

Thus, in the non-volatile memory 15, the specified data, which is the valid data of one page, is copied from the cache block 32 or the logical block 31 to the other logical block 31-2 serving as a new and unused logical block. When all the valid data of the cache block 32 or the logical block 31 has been copied to the logical block 31-2 in this copy operation, in the non-volatile memory 15, the cache block 32 or the logical block 31 is initialized at the next step ST13. As the copy operation and the initialization are completed, the non-volatile memory 15 supplies a completion signal to the control section 16 at the next step ST14.

Then, the control section 16 updates the logical/physical conversion table.

After the execution of the first garbage collection sub-operation GC1 has been completed, the control section 16 suspends the garbage collection operation.

Then, at the next step ST41, the control section 16 transmits a write-operation-in-progress response signal to the host apparatus (2).

After transmitting the write-operation-in-progress response signal to the host apparatus (2), the control section 16 resumes the garbage collection operation for releasing a cache block 32.

At steps ST15 to ST17, the control section 16 carries out the second garbage collection sub-operation GC2.

After the execution of the second garbage collection sub-operation GC2 has been completed, the control section 16 again suspends the garbage collection operation.

Then, at the next step ST42, the control section 16 transmits a write-operation-in-progress response signal to the host apparatus (2).

After transmitting the write-operation-in-progress response signal to the host apparatus (2), the control section 16 resumes the garbage collection operation for releasing a cache block 32.

The control section 16 carries out the third garbage collection sub-operation.

After the execution of the third garbage collection sub-operation has been completed, the control section 16 again suspends the garbage collection operation.

Then, the control section 16 transmits a write-operation-in-progress response signal to the host apparatus (2).

After transmitting the write-operation-in-progress response signal to the host apparatus (2), the control section 16 resumes the garbage collection operation for releasing a cache block 32.

At steps ST22 to ST24, the control section 16 carries out the fourth garbage collection sub-operation.

After the execution of the fourth garbage collection sub-operation has been completed, the control section 16 terminates the garbage collection operation.

Then, at the step 43, the control section 16 transmits a write-completion response signal to the host apparatus (2).

By carrying out a plurality of garbage collection sub-operations composing the garbage collection operation as described above, the control section 16 is capable of performing the garbage collection operation to process a plurality of cache blocks 32.

In the garbage collection operation, the cache blocks 32 are initialized and released.

As described above, in the second embodiment, in order to release a cache block 32, a garbage collection operation is carried out during the period of an access made in the host apparatus (2) as an access to the memory 45 by dividing the garbage collection operation into a plurality of garbage collection sub-operations.

In addition, at a time between every two adjacent ones of the garbage collection sub-operations, the control section 16 transmits a write-operation-in-progress response signal and a write-completion response signal to the host apparatus (2).

Thus, in the case of the second embodiment, even if a garbage collection operation is carried out in order to release cache blocks 32 during the period of an access made by the host apparatus (2), the host apparatus (2) can be prevented from being left as it is in a state of receiving no response signal from the memory card 1.

As a result, in the second embodiment, there is no case in which the host apparatus (2) enters a state of a timeout for the access completion response signal to be received from the memory card 1 due to a garbage collection operation carried out during the period of the access in order to release a cache block 32.

Each of the configurations of the embodiment described above is no more than a typical preferred implementation of the present invention. That is to say, implementations of the present invention are by no means limited to the embodiment. In other words, the embodiment can be changed to a variety of any modified and/or redesigned versions as long as the modified and/or redesigned versions fall within a range which does not deviate from essentials of the present invention.

In the embodiments described above for example, the control section 16 carries out the garbage collection operation in order to release a cache block 32 by dividing the garbage collection operation into a plurality of garbage collection sub-operations.

As another example, the control section 16 may also carry out the garbage collection operation in order to release a plurality of cache blocks 32 by dividing the garbage collection operation into a plurality of garbage collection sub-operations.

As explained earlier, in the embodiment described above, the control section 16 carries out divided garbage collection operations to process a cache block in the period of a write access made by the host apparatus (2). However, the embodiment can be changed to a typical modified version as follows.

For example, the control section 16 may also carry out divided garbage collection operations to process a cache block in the period of a read access made by the host apparatus (2).

In the embodiment described above, one processor 12 carries out control processing and the garbage collection operation on the basis of an access made by the host apparatus (2). However, the embodiment can be changed to a typical modified version as follows.

For example, the control section 16 may also carry out the control processing by making use of a specific processor and the garbage collection operation by making use of a processor other than the specific processor.

In the embodiment described above, the memory card 1 makes use of a flash memory of the NAND type to serve as the nonvolatile memory 15. However, the embodiment can be changed to a typical modified version as follows.

For example, the memory card 1 may also make use of a flash memory of the NOR type to serve as the nonvolatile memory 15.

In the embodiment described above, the memory card 1 is used as a storage apparatus of the card type. However, the embodiment can be changed to a typical modified version as follows.

For example, as the storage apparatus, it is also possible to make use of a USB memory, an SSD memory embedded in the host apparatus, an eMMC memory or the like.

In the embodiment described above, the camera apparatus 2 is used as the host apparatus. However, the embodiment can be changed to a typical modified version as follows.

For example, as the host apparatus, it is also possible to make use of a computer, a mobile phone, an electronic apparatus, a PDA, a navigation apparatus, a reproduction apparatus or the like.

In the embodiment described above, the host input/output section 46 connected to the device input/output section 11 exchanges data with the device input/output section 11 in accordance with a communication method which conforms to specifications such as the PCI Express specifications or the USB3.0 specifications. However, the embodiment can be changed to a typical modified version as follows.

For example, the device input/output section 11 can also exchange data with the host input/output section 46 through short-distance radio communication or the like.

The present application contains subject matter related to that disclosed in Japanese Priority Patent Application JP 2010-060208 filed in the Japan Patent Office on Mar. 17, 2010, the entire content of which is hereby incorporated by reference.

It should be understood by those skilled in the art that a variety of modifications, combinations, sub-combinations and alterations may occur, depending on design requirements and other factors as far as they are within the scope of the appended claims or the equivalents thereof.

What is claimed is:

1. A storage apparatus comprising:
an input/output section configured to input and output data related to an external access made by a host apparatus;
a memory for storing input data input by the input/output section, the memory including a plurality of areas and being configured to distribute the input data to the plurality of areas while making use of a cache area to temporarily store the input data; and
a control section configured to make an access to the memory based on the external access made by the host apparatus, the external access including a write access made by the host apparatus, and to carry out a garbage collection operation on the plurality of areas including the cache area in order to release the cache area during a period of the write access made by the host apparatus,
wherein,
the control section carries out the garbage collection operation on the plurality of areas including the cache area during the period of the write access made by the host apparatus by dividing the garbage collection operation into a plurality of garbage collection sub-operations, and
the control section responds to the write access made by the host apparatus at a time between every two adjacent garbage collection sub-operations, the control section transmitting (i) a write-operation-in-progress response signal to the host apparatus at the time between every two adjacent garbage collection sub-operations and (ii) a write completion response signal to the host apparatus after an execution of a last one of the plurality of garbage collection sub-operations.

2. The storage apparatus according to claim 1, wherein:
the control section makes use of some of the plurality of areas of the memory as a plurality of cache areas, and when a number of the plurality of cache areas exceeds a prescribed number, the control section carries out the garbage collection operation on the plurality of areas including the plurality of cache areas during the period of the write access made by the host apparatus.

3. A storage system comprising:
a host apparatus; and
a storage apparatus accessible to the host apparatus, the storage apparatus including
an input/output section configured to input and output data related to an external access made by the host apparatus,
a memory for storing input data input by the input/output section, the memory including a plurality of areas and being configured to distribute the input data to the plurality of areas while making use of a cache area to temporarily store the input data, and
a control section configured to make an access to the memory based on the external access made by the host apparatus, the external access including a write access made by the host apparatus, and to carry out a garbage collection operation on the plurality of areas including the cache area in order to release the cache area during a period of the write access made by the host apparatus,
wherein,
the control section carries out the garbage collection operation on the plurality of areas including the cache area during the period of the write access made by the host apparatus by dividing the garbage collection operation into a plurality of garbage collection sub-operations, and
the control section responds to the write access made by the host apparatus at a time between every two adjacent garbage collection sub-operations, the control section transmitting (i) a write-operation-in-progress response signal to the host apparatus at the time between ever two adjacent garbage collection sub-operations and (ii) a write completion response signal to the host apparatus after an execution of a last one of the plurality of garbage collection sub-operations.

4. The storage apparatus of claim 1, wherein the write access includes a write command issued by the host apparatus to write data into the storage apparatus.

* * * * *